Patented Jan. 23, 1923.

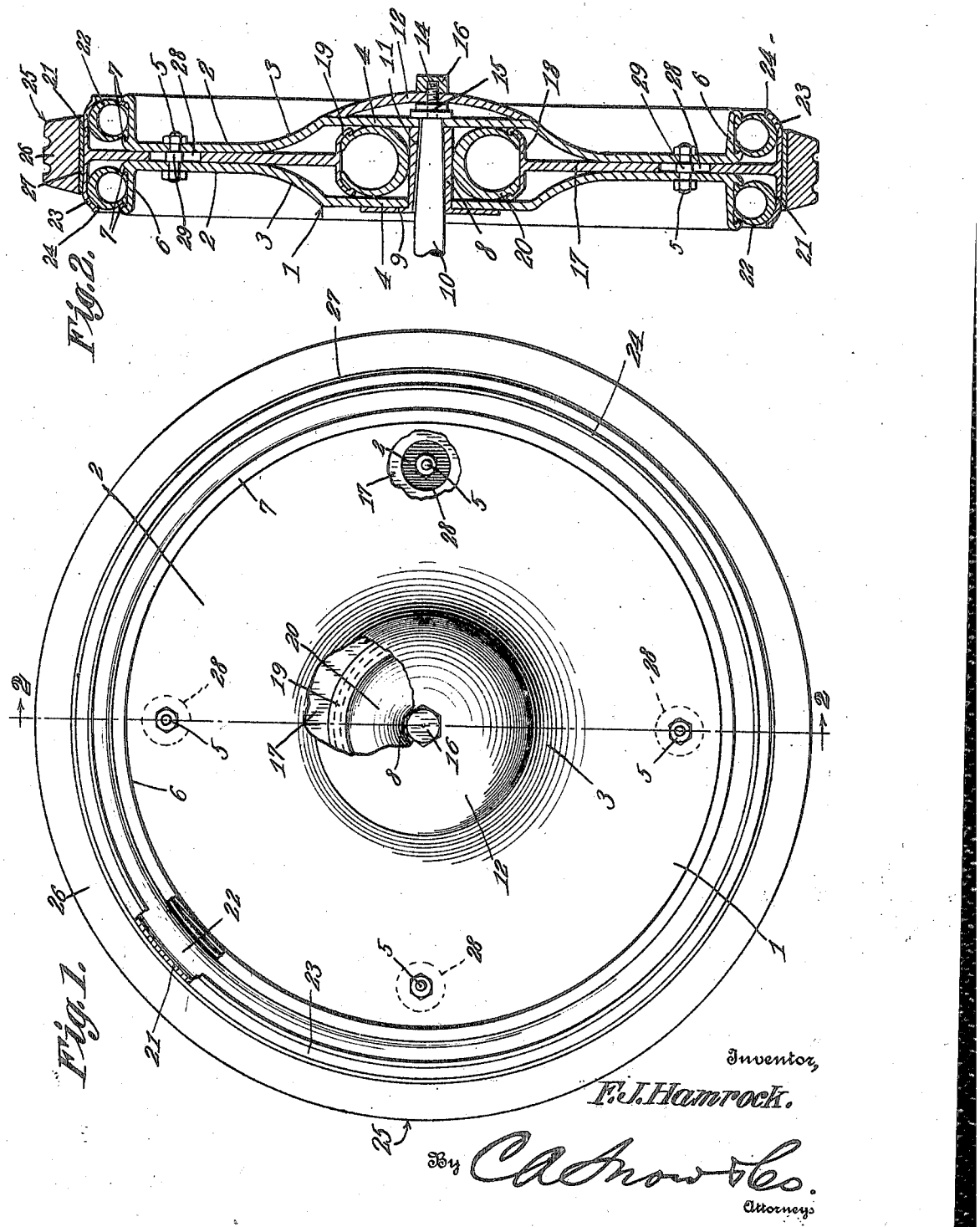

1,443,126

UNITED STATES PATENT OFFICE.

FRANK J. HAMROCK, OF HOMESTEAD, PENNSYLVANIA.

WHEEL.

Application filed November 17, 1920. Serial No. 424,708.

*To all whom it may concern:*

Be it known that I, FRANK J. HAMROCK, a citizen of the United States, residing at Homestead, in the county of Allegheny and State of Pennsylvania, have invented a new and useful Wheel, of which the following is a specification.

It is the object of this invention to provide novel means whereby the desired resiliency may be afforded in a vehicle wheel, without subjecting the cushions to wear due to contact with the roadway.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a device constructed in accordance with the invention, parts being broken away; and Figure 2 is a section taken approximately on the line 2—2 of Figure 1, parts appearing in elevation.

The wheel forming the subject matter of this application includes a body 1 comprising side members 2 in the form of plates, the plates 2 having diverging parts 3 merging into central portions 4 which are disposed approximately parallel to each other. The plates 2 are connected by securing elements 5, which may be bolts. At their periphery, the plates 2 have outwardly extending shoulders 6 supplied, if desired, with clincher flanges 7.

A hub 8 extends through one of the central portions 4 and abuts against the other central portion. The hub 8 is supplied at one end with a head 9 secured to the first specified central portion. An axle 10 extends within the hub 8 and may be keyed thereto as shown at 11, if the wheel is to be driven. A bowed hub disk 12 cooperates with one of the central portions 4. The axle 10 includes a spindle 14 extended though the hub disk 12. A nut 15 is threaded on the spindle 14 and abuts against the adjacent central portion 4. A nut 16 is threaded on the spindle 14 and holds the disk 12 in place.

The wheel comprises a movable member 17, preferably in the form of a plate, mounted to slide between the side members or plates 2 of the wheel body 1. The movable member or plate 17 has an internal rim 18 located between the parts 4 of the plates 2, the rim 18 being supplied, if desired, with clincher flanges 19, adapted to retain an inflatable element 20 which surrounds and bears upon the hub 8, the member 20 constituting a cushion. At its periphery, the movable member or plate 17 has oppositely projecting flanges 21. Inflatable elements 22 are held by the clincher flanges 7 on the shoulders 6 of the wheel body 1, the flanges 21 of the movable member 17 bearing on the inflatable elements, the said elements, obviously, constituting cushions. The flanges 21 are curved inwardly, as indicated at 23 to conform to the cross section of the parts 22, the lateral edges of the flanges 21 being curved outwardly, as indicated at 24, so as to avoid a cutting of the cushions.

On the flanges 21 is mounted a tire 25 which may be variously constructed. The tire 25 may include a body 26, made of solid rubber or any other material, the body being carried by a plate 27 which, in its turn, is secured to the flanges 21 of the movable member 17. The plate 27 is in the form of a ring and may be made of metal if desired.

Openings 28 are formed in the plate 17, and through these openings, the securing elements 5 extend. Rollers 29 are journaled on the securing elements 5 and are located between the plates 2, the rollers operating in the openings 28.

The openings 28 are large enough so that relative movement between the member 17 and the body 1 may take place, the cushions 20 and 22 being subjected to compression and affording the desired resiliency.

Having thus described the invention, what is claimed is:—

A wheel comprising a body including side members having diverging parts merging into central portions which are disposed in approximate parallelism, the side members being provided at their periphery with outwardly extended shoulders, a hub carrying the body; securing elements connecting the side members and located between the shoulders on the one hand and said diverging parts on the other hand; a movable member in the form of a plate which is slidable between the side members, the plate having openings receiving the securing elements loosely, the movable member being provided with oppositely projecting flanges located between the central portions of the side members, a circumferential cushion being interposed between said flanges and the hub, the movable member being provided at its periphery with oppositely projecting flanges, and inflatable cushions cooperating with the last specified flanges of the movable member and with the shoulders of the side members, the shoulders of the side members being provided with clincher elements retaining the inflatable cushions, the last specified flanges of the movable member being curved transversely to cooperate with the cushions, and the cushions being spaced from the movable member, transversely of the wheel, the clincher elements and the said curved portions of the last specified flanges coacting to hold the inflatable cushions against outward movement, and against inward movement with respect to the movable member.

In testimony that I claim the foregoing as my own, I have hereto affixed my signature in the presence of two witnesses.

FRANK J. HAMROCK.

Witnesses:
J. CLYDE MILLER,
JULIUS C. HAMROCK.